United States Patent
Guo

(10) Patent No.: US 11,645,512 B2
(45) Date of Patent: May 9, 2023

(54) MEMORY LAYOUTS AND CONVERSION TO IMPROVE NEURAL NETWORK INFERENCE PERFORMANCE

(71) Applicant: Baidu USA LLC, Sunnyvale, CA (US)

(72) Inventor: Min Guo, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 955 days.

(21) Appl. No.: 16/399,390

(22) Filed: Apr. 30, 2019

(65) Prior Publication Data
US 2020/0349424 A1 Nov. 5, 2020

(51) Int. Cl.
*G06N 3/08* (2006.01)
*G06N 5/04* (2006.01)

(52) U.S. Cl.
CPC .............. *G06N 3/08* (2013.01); *G06N 5/04* (2013.01)

(58) Field of Classification Search
CPC .................................. G06N 3/08; G06N 5/04
USPC ........................................................... 706/25
See application file for complete search history.

(56) References Cited

U.S. PATENT DOCUMENTS

| 2016/0342888 | A1* | 11/2016 | Yang | ..................... | G06V 10/82 |
| 2019/0377792 | A1* | 12/2019 | Zhang | ..................... | G06N 5/022 |

OTHER PUBLICATIONS

Chao Li et al, 2016, "Optimizing Memory Efficiency for Deep Convolutional Neural Networks on GPUs" (Year: 2016).*
Heehoom Kim et al., 2017, "Performance Analysis of CNN Frameworks for GPUs" (Year: 2017).*
Zhou etal, 2018, "Resource-Efficient Neural Architect" (Year: 2018).*
Herbert et al, Mar. 21, 2019, "CNN Inference with cuDNN" (Year: 2019).*
Wang et al., 2018, "A Survey of FPGA Based Deep Learning Accelerators: Challenges and Opportunities" (Year: 2018).*

* cited by examiner

*Primary Examiner* — Abdullah Al Kawsar
*Assistant Examiner* — Jun Kwon
(74) *Attorney, Agent, or Firm* — Womble Bond Dickinson (US) LLP

(57) ABSTRACT

Memory layout and conversion are disclosed to improve neural network (NN) inference performance. For one example, a NN selects a memory layout for a neural network (NN) among a plurality of different memory layouts based on thresholds derived from performance simulations of the NN. The NN stores multi-dimensional NN kernel computation data using the selected memory layout during NN inference. The memory layouts to be selected can be a channel, height, width, and batches (CHWN) layout, a batches, height, width and channel (NHWC) layout, and a batches, channel, height and width (NCHW) layout. If the multi-dimensional NN kernel computation data is not in the selected memory layout, the NN transforms the multi-dimensional NN kernel computation data for the selected memory layout.

20 Claims, 7 Drawing Sheets

MEMORY LAYOUTS AND CONVERSION TO IMPROVE NEURAL NETWORK INFERENCE PERFORMANCE

FIELD

Embodiments of the invention relate generally to data and computation processing including neural networks (NN) and memory. More particularly, embodiments of the invention relate to memory layouts and conversion to improve NN inference performance.

BACKGROUND

A neural network (NN) is a type of machine learning which models itself after the human brain. For example, a NN receives inputs (vectors) and transforms the inputs using weights or filters through a series of hidden layers made of nodes (neurons). Each node can be connected to nodes in the previous layer to receive inputs, and the last output layer or fully-connected layer can provide a classification or class score. One type of NN popular for classifying images is a convolutional neural network (CNN)—e.g., using the CNN to determine if an input image shows a vehicle. A CNN includes layers of nodes (neurons) that have learnable weights and biases. Each node can receive inputs and perform a dot product (kernel computation) of each input with weights that are summed across the different inputs. The weighted sum is fed into another layer of nodes that leads to a differentiable score at the output layer—i.e., raw image pixel inputs on one end to class scores at the output end used classify the image.

For a CNN, generating activations or results at each node can be computation extensive, especially because a CNN can have nodes at each layer arranged in multiple dimensions such as width, height and depth and there can be thousands of layers. Performing the CNN computations to determine a classification of input data, which is referred to as inference, requires extensive memory use because input data has multiple dimensions and kernel functions to perform the weighted dot product computations exacts substantial amount of memory access. In addition, physical memory stores data in linear one dimension—i.e., one row at a time, which requires correlation with the multi-dimensional data used by the CNN. As such, the data layout in physical memory on how NN data is stored can significantly affect the NN inference performance.

BRIEF DESCRIPTION OF THE DRAWINGS

The appended drawings illustrate examples and embodiments and are, therefore, exemplary and not considered to be limiting in scope.

DETAILED DESCRIPTION

Figure 1:
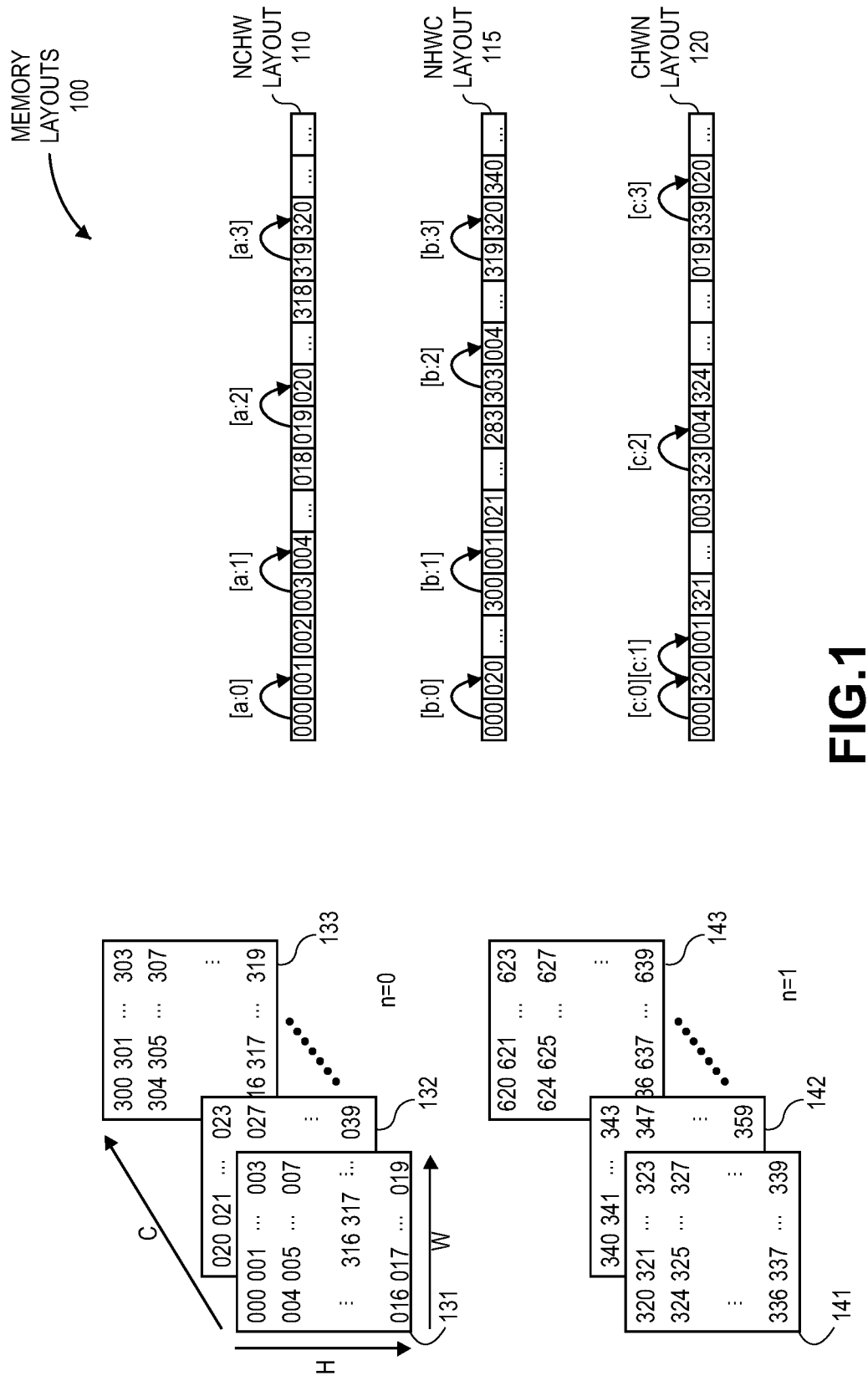
FIG. 1 illustrates one example of neural network (NN) memory layouts for multi-dimensional data.

The following detailed description provides embodiments and examples of memory layouts and conversion to improve neural network (NN) inference performance. Reference to a neural network (NN) includes any type of neural network including deep neural networks (DNNs) and convolutional neural networks (CNNs). A NN can be an instance of a machine learning algorithm or process and can be trained to perform a given task such as classifying input data, e.g., input images. Training a NN can involve determining weights and biases for data passing through the NN. Once trained, a NN can perform a task by computing an output using the weights and biases at any number of layers to produce activations to determine a classification of the input data. As such, running or implementing the NN with these weights and biases to determine an output (e.g., a class score) can be referred to as inference. In the following embodiments and examples, NN inference can be performed on embedded devices, systems or hardware including integrated circuits, system on a chip (SOC), processors, central processing units (CPUs) or graphical processing units (GPUs).

To improve NN inference performance, for one example, a NN selects a memory layout among a plurality of different memory layouts based on thresholds derived from performance simulations of the NN. The NN stores multi-dimensional kernel computation data using the selected memory layout during NN inference. The memory layouts to be selected can be a channel, height, width, and batches (CHWN) layout, a batches, height, width and channel (NHWC) layout, and a batches, channel, height and width (NCHW) layout. If the NN kernel computation data is not in the selected memory layout, the NN transforms the NN kernel computation data for the selected memory layout. For one example, thresholds such as Ct, Nt and Fmt are used to select a memory layouts. The Ct threshold is a channel number threshold, the Nt threshold is a batch number threshold, and the Fmt is a current layer giga floating point operations (GFlops)/current layer memory feature map threshold. These thresholds Ct, Nt and Fmt can be optimized and derived based on performance simulations of the NN.

For one example, the CHWN layout is selected if a number of channels C based on input data is less than the Ct threshold or if a number of batches N based on the input data is equal to or greater than the Nt threshold. For another example, the NHWC layout is selected if a number of floating point operations divided by a memory size is greater than a the Fmt threshold. For another example, the NCHW layout is selected if neither the CHWN and NHWC layouts are selected. By using optimized thresholds to select a particular NN memory layout, the selected memory layout improves data memory access and computational efficiency for NN inference performance.

Reference in the detailed description to "one embodiment" or "one example" means that a particular feature, structure, or characteristic described in conjunction with the embodiment or example can be included in at least one embodiment or example of the disclosure. The appearances of the phrase "in one embodiment" or "in one example" in various places in the detailed description do not necessarily refer to the same embodiment or example.

As set forth herein, various embodiments, examples and aspects will be described with reference to details discussed below, and the accompanying drawings will illustrate various embodiments and examples. The following description and drawings are illustrative and are not to be considered as limiting. Numerous specific details are described to provide a thorough understanding of various embodiments and examples. However, in certain instances, well-known or conventional details are not described to facilitate a concise discussion of the embodiments and examples.

Neural Network Memory Layout Examples

FIG. 1 illustrates one example of neural network (NN) memory layouts 100 for multi-dimensional data. NN multi-dimensional data can have different formats including the NCHW layout 110, NHWC layout 120, and CHWN layout 130 stored in linear memory address space. For memory layouts 100, C refers to channels which are feature maps, e.g., feature maps 131-133 and 141-143. N refers to number of batches or sets of feature maps, e.g., in this example, there are 2 batches such that N=2. The batches are indexed by n=0 including feature maps 130-133 and n=1 including feature maps 141-143. Each feature map 131-133 and 141-143 has a height H dimension and a width W dimension. For one example, feature maps 131-133 and 141-143 for each batch n=0 and n=1 can refer to images processed by the NN.

Referring to the NCHW layout 110, the layout is for a four-dimension activation at a NN layer. The NCHW layout 110 can be for 2 batches where N=2 having with two indices n=0 and n=1 16 channels C and a 5×4 spatial domain for height H and width W. For these dimensions, the NCHW layout 110 illustrates how multi-dimensional data is laid out linearly in memory for storage and access in the NCHW format. For example, in the NCHW layout 110, multi-dimensional data is laid out from the first batch n=0, first channel or feature map 131 at the first row where H and W=1. After the first channel or feature map 131, multi-dimensional data is laid in memory out from the next channel or feature map 132 at H and W until the last channel or feature map 133. The multi-dimensional data then goes to the next batch (n=1) for channels or feature maps 141 to 143 at H and W.

In the NCHW layout 110, [a:n] refers to the jumps of the multi-dimensional data laid out in one-dimensional format in memory for the NCHW layout 110. At [a:0], within the first line from left to right are values at 000 and 001 in feature map 131, which are indices in the feature map 131. At [a:1], multi-dimensional data jumps to the next line or row (H=2) of feature map 131 as values at 003 and 004 until H=5 and W=4 for feature map 131. At [a:2], multi-dimensional data jumps to the next channel or feature map 132 (C=2) as values at 019 and 020 until H=5 and W=4 for feature map 132. At [a:3], multi-dimensional data jumps to the next batch n=1 to the first feature map 141 as values at 319 and 320. The offset function (A) on how multi-dimensional data in the NCHW layout 110 is stored linearly in physical memory is:

$$nchw(n,c,h,w)=n*CHW+c*HW+h*W+w \quad (A)$$

The lower-case letters for nchw denote that w is the inner-most dimension such that two elements adjacent in memory would share the same indices of n, c, and h, and their index of w would be different by 1. In this example, n is the outermost dimension here such that if taking the same pixel (c, h, w), but on the next image, the data jumps to a whole image size C*H*W.

Referring to the NHWC layout 115, multi-dimensional data is laid out from the first batch n=0 at H and W in each feature map 131 to 133. For example, at [b:0] in NHWC layout 115, within the first line from left to right is values at 000 at H and W=1 in feature map 131 and 020 at H and W=1 in feature map 132 and continues linearly in memory to the last feature map 133. At [b:1], multi-dimensional data goes to the next data in the W dimension for H=1 as values at 300 001 until W=4. At [b:2], multi-dimensional data jumps to the next row or H=2 as values at 303 in feature map 133 and at 004 in feature map 131. At [a:3], multi-dimensional data jumps to the next batch n=1 to the first feature map 141 as values at 319 320. The offset function (B) on how multi-dimensional data in the NHWC layout 110 is stored linearly in physical memory is:

$$nhwc(n,h,w,c)=n*HWC+h*WC+w*C+c \quad (B)$$

In the NHWC layout 115, the inner-most dimension is channels ([b:0]) that is followed by width ([b:1]), height ([b:2]), and finally batch ([b:3]).

Referring to the CHWN layout 120, multi-dimensional data is laid out from the channels at H and W in each batch n=0 and n=1. For example, at [c:0] in the CHWN layout 120, within the first line from left to right is a value at 000 in feature map 131 of batch n=0 and a value at 320 in feature map 141 in batch n=1 at H and W=1. At [c:1], multi-dimensional data goes to the next data in the W dimension for H=1 as a value at 001 in feature map 131 at W=2. At [c:2], multi-dimensional data jumps from the row at H=1 in feature map 141 to the row H=2 in feature map 131 at W=1 for a value at 004 in feature map 131. At [c:3], multi-dimensional data jumps from the last row in the first channel of feature map 141 of batch n=1 to the second channel of feature map 132 at H and W=1 for a value at 339 in feature map 141 to a value at 020 in feature map 132 for the next channel at C=2. The offset function (C) on how multi-dimensional data in the CHWN layout 120 is stored linearly in physical memory is:

$$chwn(c,h,w,n)=c*HWN+h*WN+w*N+n \quad (C)$$

In the CHWN layout 120, the dimensions order is from inner-most to outer-most as batch ([c:0]), width ([c:1]), height ([c:2]), channels ([c:3]).

Neural Network Kernel Computation Example

Figure 2:
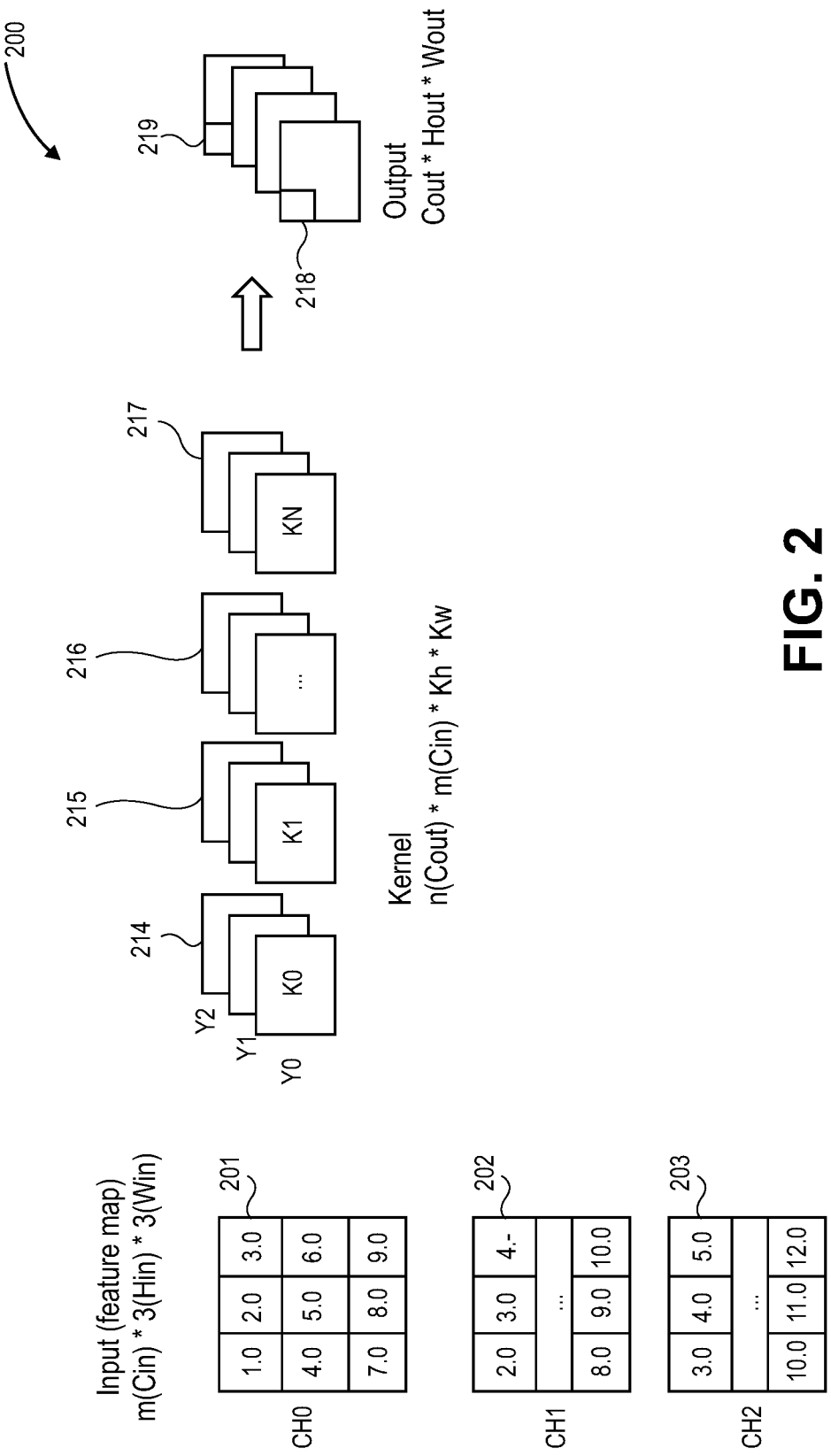
FIG. 2 illustrates one example diagram of a kernel computation using the NCHW format.

FIG. 2 illustrates one example diagram 200 of a kernel computation using the NCHW format. In this example, kernels 214-217 are filters from K0-KN for a convolutional neural network (CNN). This example can be used for a single instruction multiple data (SIMD) instruction such that in one cycle 4× floating point (FP) 32 bits can be read=128 bits. Kernels 214-217 (K0-KN) can include 1×1 filters for N convolution layers of the CNN. Inputs Y0-Y2 can be derived from values of the 3×3 feature maps 201-203 (CH0-CH2) which can be stored in a NCHW format (1×3×3×3). Other memory layout formats such as NHWC or CHWN layouts can be used for a kernel computation.

For one example, the indices to the input feature maps 201-203 can be m(Cin)*3(Hin)*3(Win). The kernels 214-217 (K0-KN) can have a dimension (3×1×1×N) and the output of the kernel computation is referred to as Output. The indices to the kernels K0-KN can be n(Cout)*m(Cin)*Kh*kw. The indices to the Output can be Cout*Hout*Wout. The kernel computation (D) to generate the Output can be expressed as:

$$Cout[N][C][H][W] = \sum_{c=1}^{cin} \sum_{h=1}^{kh} \sum_{w=1}^{kw} in[N][c][H+h][W+w]*filter[c][h][w] \qquad (D)$$

wherein h refers to feature map height and w refers to feature map width.

In this CNN example, filters include weights (i.e., synapses) and input and output feature maps include activations (i.e., input and output nodes or neurons). Referring to the kernel computation (D), CPUs or GPUs or other processing units can use the SIMD instruction set to perform multiply accumulate (MAC) operations, which are matrix multiplication computations of the filters to input data that are summed across c h and w. Other instruction sets such as single instruction multiple thread SIMT can also be used. For one example, referring to FIG. 2, the Output 218 can be computed as Output 0 0=CH0[0][0]*K0Y0+CH1[0][0]*K0Y1+CH2[0][0]*K0Y2 and the Output 219 can be computed as Output 2 0=CH0[2][0]*KNY0+CH1[2][0]*KNY1+CH2[2][0]*KNY2.

Memory Layout Simulation Examples and Thresholds

Figure 3:
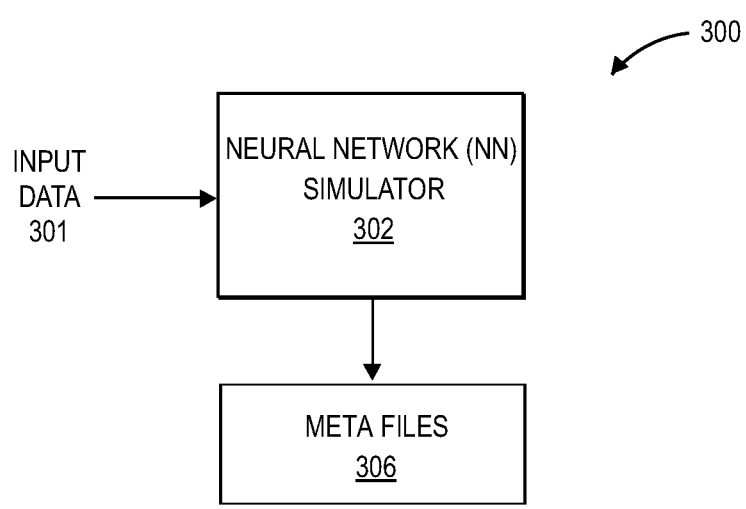
FIG. 3 illustrates one example block diagram of a system having a NN simulator generating a meta-file from input data.

FIG. 3 illustrates one example block diagram of a system 300 having a NN simulator 302 generating a meta-file 306 from input data 301. NN simulator 302 can include any type of embedded device, system or hardware including integrated circuits, system on a chip (SOC), processors, central processing units (CPUs) or graphical processing units (GPUs) to perform NN inference including kernel computations for a CNN as described above and in FIG. 2. For one example, NN simulator 302 can simulate the NN system 600 shown in FIG. 6.

For one example, NN simulator 302 can perform a Cuda-convnet CNN implementation on input data 301 using a feed-forward network and a CuDNN implementation on input data 301 that can provide highly tuned implementations for standard routines such as forward and backward convolution, pooling, normalization and activation layers. Input data 301 can be any type of data, e.g., image data having any number of feature maps and channels including Red (R) channels, Blue (B) channels and Green (G) channels.

Figure 4A:
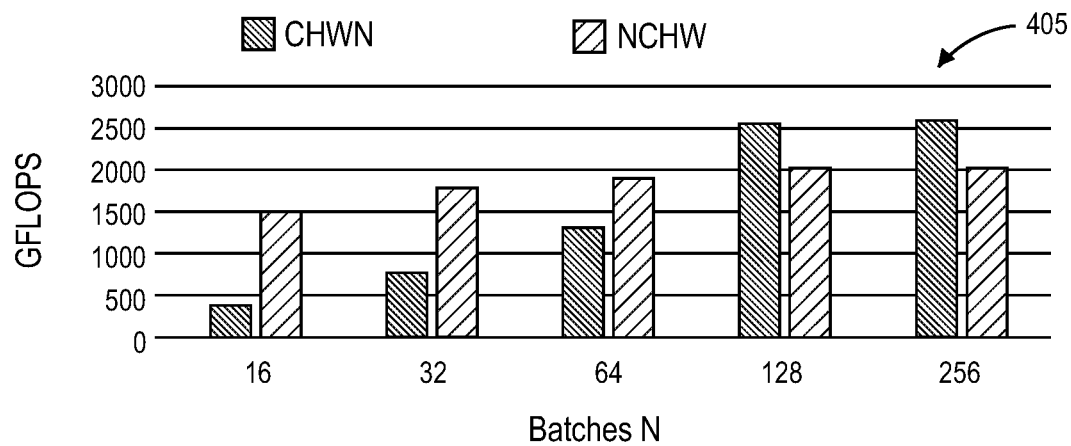
FIG. 4A illustrates one example of a chart plotting GFlops to changing values of batches N for the NCHW layout and the CHWN layout.

Referring to FIG. 4A, NN simulator 302 can measure giga-floating point operations (GFlops) in a NCHW format and CHWN format for different values of N number of batches as shown in chart 405 based on simulations. For example, CuDNN inference simulation can be used using data in a NCHW format and Cuda-convnet inference simulation can be used in a CHWN format to generate chart 405. The value N can represent 16, 32, 64, 128 and 256 batches of input data or feature maps, which can be used for both CuDNN and Cuda-convnet simulations. At N values of 16, 32 and 65, the NCHW format performs a greater number of GFlops than the performance using the CHWN format. At N values 128 and 256, the Cuda-convnet inference performance using NCHW performs a greater number of GFlops than the CuDNN using NCHW. In this example, at N values between 64 and 128, the performance using the CHWN format starts to outperform the NCHW format performance.

As can be seen form this example, a Nt threshold can be determined between N=64 and N=128.

Figure 4B:
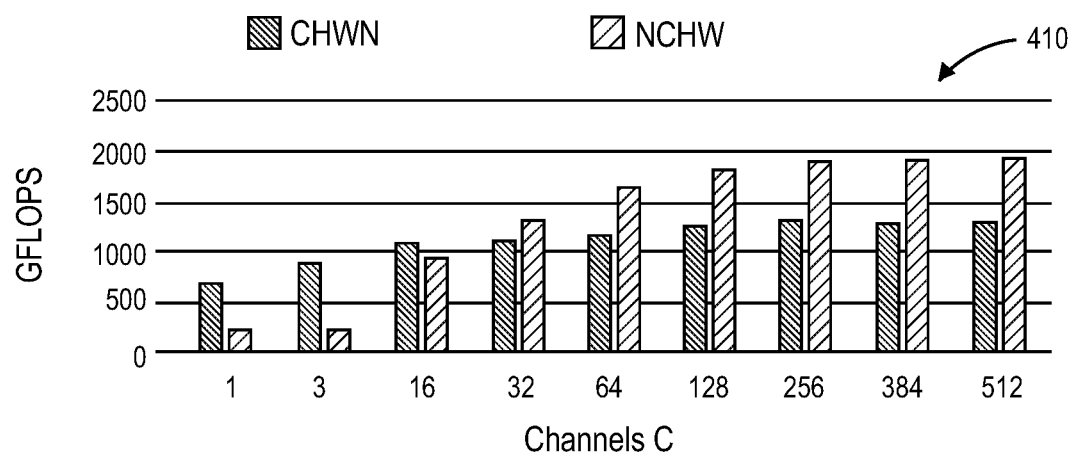
FIG. 4B illustrates one example of a chart plotting GFlops to changing values of channels C for the NCHW layout and CHWN layout.

Referring to FIG. 4B, NN simulator 302 can measure GFlops in a NCHW format and CHWN format for different values of C or number of channels as shown in chart 410 based on simulations. For example, CuDNN inference simulation can be used using data in a NCHW format and Cuda-convnet inference simulation can be used in a CHWN format to generate chart 410. The values of C can be 1, 3, 16, 32, 64, 128, 256, 384 and 512 of channels or feature maps of images, which can be used CuDNN and Cuda-convnet simulations. At C values of 1, 3 and 16, performance using the CHWN format performs a greater number of GFlops than the performance using the NCHW format. At C values of 32 to 512, the performance using the NCHW format performs a greater number of GFlops than the performance using the CHWN format. In this example, at C values between 16 and 32, a threshold Ct can be determined between C=16 and C=32. Other types of charts can also be generated and thresholds determined such as GFlops over different memory sizes in determining a threshold Fmt for GFlops/memory size wherein one format outputs another in relation to GFlops performance. The GFlop performance in the charts 405 and 410 can be based on roofline performance for a NN that rooflines at a certain memory bandwidth. The charts, roofline data and determined thresholds, e.g., Nt, Ct, and Fmt, can be stored in meta file 306 for use in the embodiments and examples described herein in selecting memory layouts to improve NN inference performance.

Memory Layout Selection Example in Software

Figure 5:
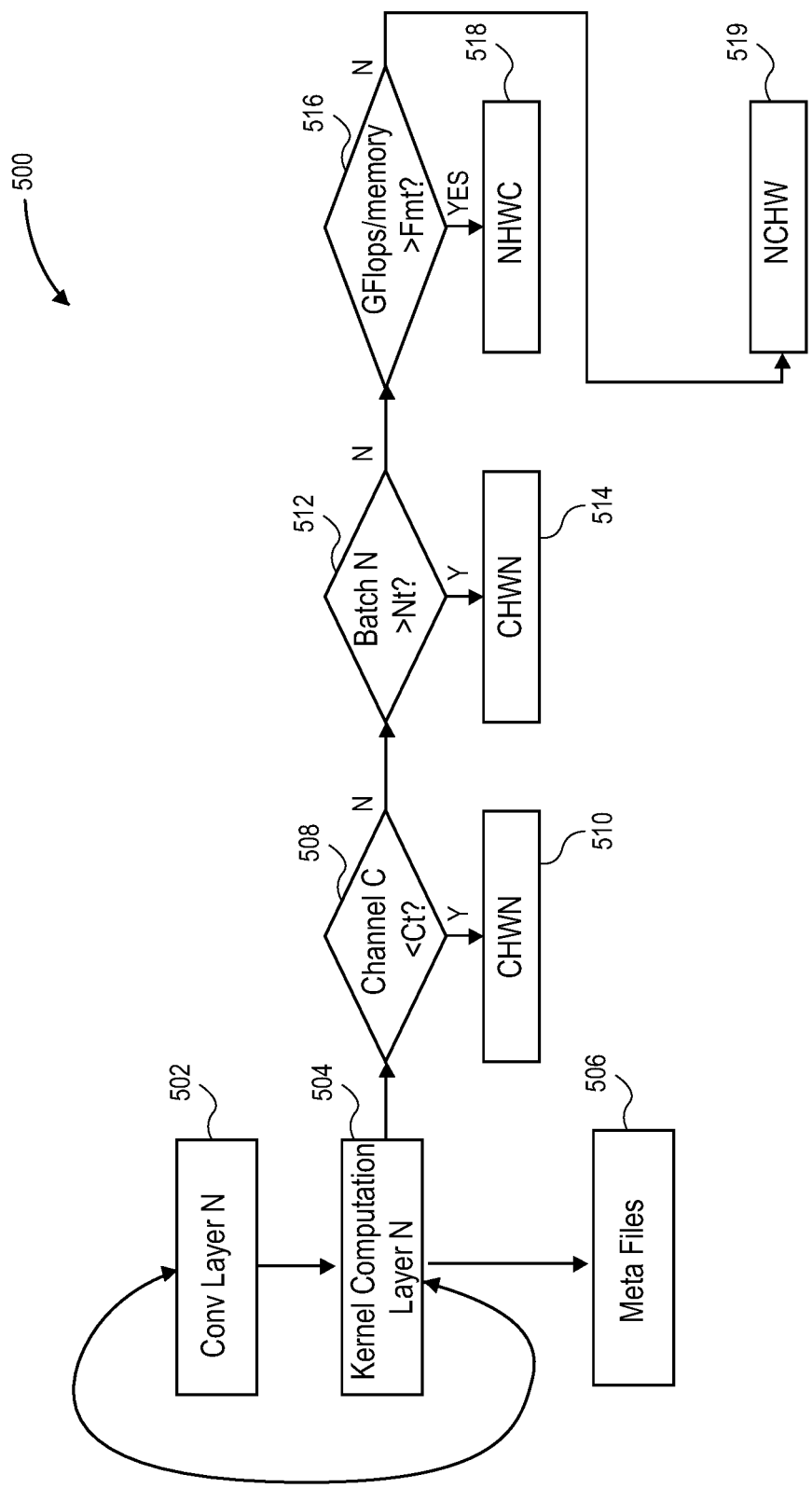
FIG. 5 illustrates one example of a flow diagram of an operation to select a memory layout.

FIG. 5 illustrates one example of a flow diagram an operation 500 to select a memory layout for a NN. For one example, any type of embedded device, system or hardware including integrated circuits, system on a chip (SOC), processors, central processing units (CPUs) or graphical processing units (GPUs) to implement program code, firmware or software to perform blocks 502-519 of operation 500 for a NN such as system 600 of FIG. 6. For the example of FIG. 5, a CNN is referred to as having any number of convolution layers N. Operation 500 can be included as an optimization feature of a NN.

At block 502, a NN starts a convolution layer N for NN inference performance. Initially, NN data is using the NCHW format.

At block 504, a kernel computation is performed at layer N including weights and activation computations. The weights and activations at block 504 can be used in blocks 508-519 to select a memory layout for optimization purposes and improve inference performance.

At block 508, a check is made if the channel C <a channel threshold Ct. If yes (Y), at block 510, the CHWN layout is selected. For example, referring to FIG. 4B, when C is less than 32, the CHWN layout output performs the NCHW layout in terms of GFlops. In addition, the cost of memory transformation on performance used in the NCHW layout is high.

If no (N) at block 508, at block 512, a check is made if batch N >a batch threshold Nt. If yes (Y), at block 514, the CHWN layout is selected. For example, referring to FIG. 4A, when N is >64, the CHWN layout outperforms the NCHW layout in terms of GFlops. Here, the CHWN layout is the preferred choice since N is large enough to achieve both memory coalescing and data reuse.

If no (N) at block 512, at block 516, a check is made if the current layer of GFlops/current layer memory >a feature map Fmt threshold. If yes (Y), at block 518, the NHWC layout is selected as the preferred layout.

If no (N) at block 516, at block 519, the NCHW layout is selected or the status quo is maintained if the current layout is still the NCHW layout.

Operation 500 repeats itself until all the convolution layers N have been performed. For some examples using a GPU, Ct, Nt and Fmt could be (32, 128, 60) other types of NN engines or processing units, Ct, Nt, and Fmt could be (4, 16, 30). Any number of values can be used for Ct, Nt and Fmt based on the NN design, memory size, etc., which can be determined using simulations as discussed in FIGS. 3-4B.

After all the convolution layers N have been processed, at block 506, the NN can generate model meta files and convert the weights memory layout offline in hardware as will be explained in FIGS. 6-7.

Hardware Configuration Example for Transforming Memory Layouts

Figure 6:
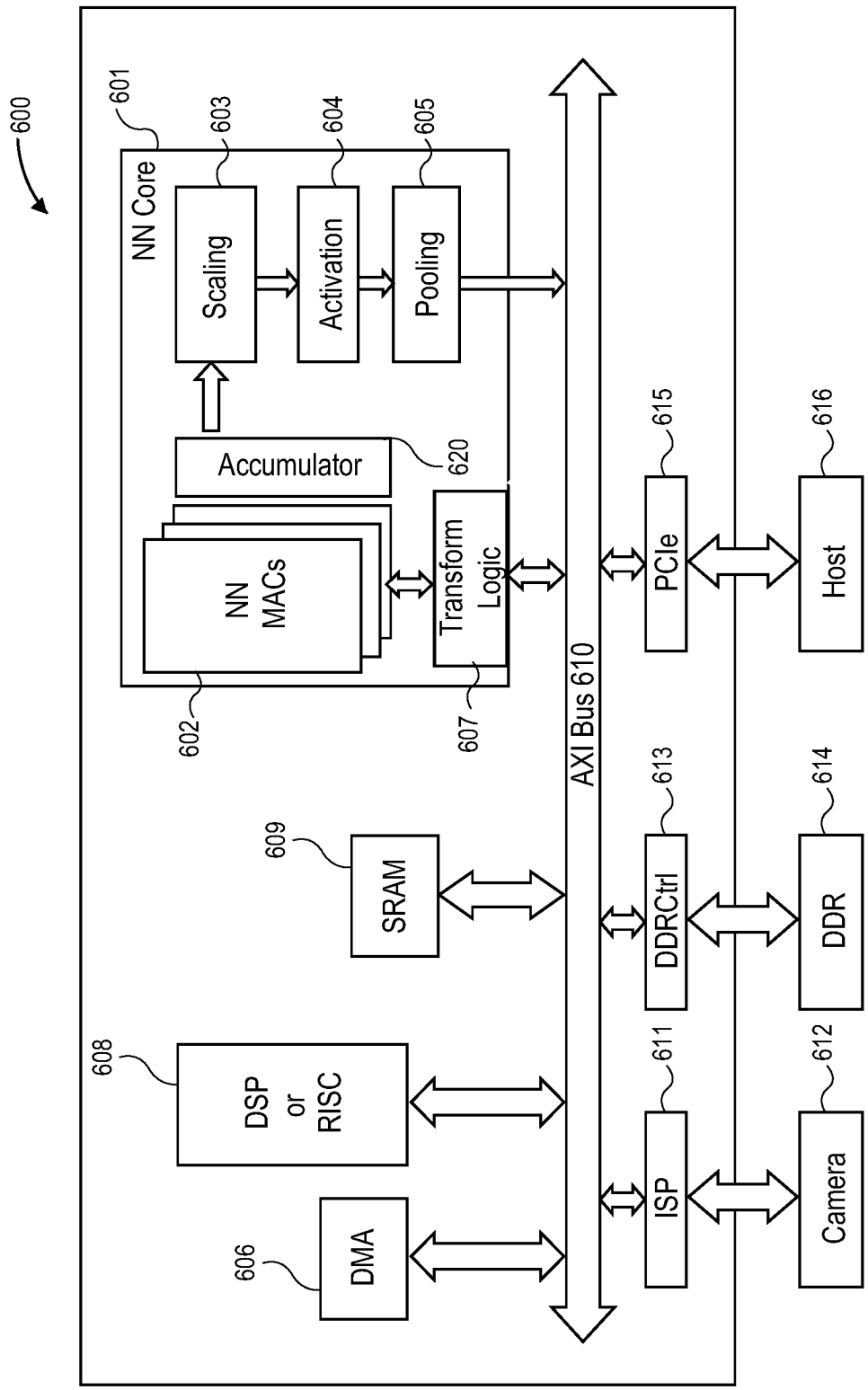
FIG. 6 illustrates one example block diagram of a NN system having a NN core.

FIG. 6 illustrates one example block diagram of a NN system 600 having a NN core 601. NN core 601 includes NN MACs 602 and blocks for scaling 603, activation 604 and pooling 605. NN MACs 602 can be multi-dimensional computation unit to compute the kernel computations as disclosed in FIG. 2 to compute Output (D) which includes matrix dot product computations which are accumulated by accumulator 620 and the outputs of accumulator are scaled at scaling block 603. After scaling, activation data is generated for a convolution layer at activation block 604. The activation data 604 can be pooled by pooling block 605 that aggregates information within each small region of input feature maps or channel and down samples the results. The pooling block 605 is coupled to the host 616 by way of the peripheral component interconnect express (PCIe) interface 615 and other components of the NN system 600 by way of advanced extensible interface (AXI) bus 610.

For one example, the output results can be stored in memory such as static random-access (SRAM) memory 609 or double data rate (DDR) memory 614 which can be a DDR synchronous dynamic random-access memory (SDRAM) having a DDR controller (DDRCtrl) 613 controlling memory access and data transfer to and from DDR memory 614. The output results of the NN core 601 can be processed by digital signal processor (DSP) or reduced instruction set control (RISC) processor 608 for classification of input data such as images. DSP or RISC processor 608 can also implement program code, firmware or software for optimizing memory layouts for NN system 600. Input data or images can be obtained from a camera 612 coupled to an image signal processor 611 within NN system 600. Image data from ISP 611 can be stored in DDR 614 or SRAM 609 or both for processing by the NN core 601 for NN inference performance to classify the input data.

For one example, DSP or RISC processor 608 can implement operation 500 as described in FIG. 5 to determine conversion or transformation of memory layouts. DSP or RISC processor 608 can signal or communicate with transform logic 607 to transform a memory layout into a format for another memory layout as described in FIG. 7. Transform logic 607 can include a field programmable gate array (FPGA), programmable logic arrays (PLAs) or other hard wired logic to convert one memory layout to another memory layout. For example, transform logic 607 can include logic that maps a NCHW layout to CHWN layout by mapping N to C, C to H, H to W and W to N. Transform logic 607 can map a NCHW layout to a NHWC layout by mapping N to N, C to H, H to W and W to C. For other examples, transform logic can map any multi-dimensional layout to any other multi-dimensional layout having the same dimensions using a dimension to dimension mapping.

Figure 7:
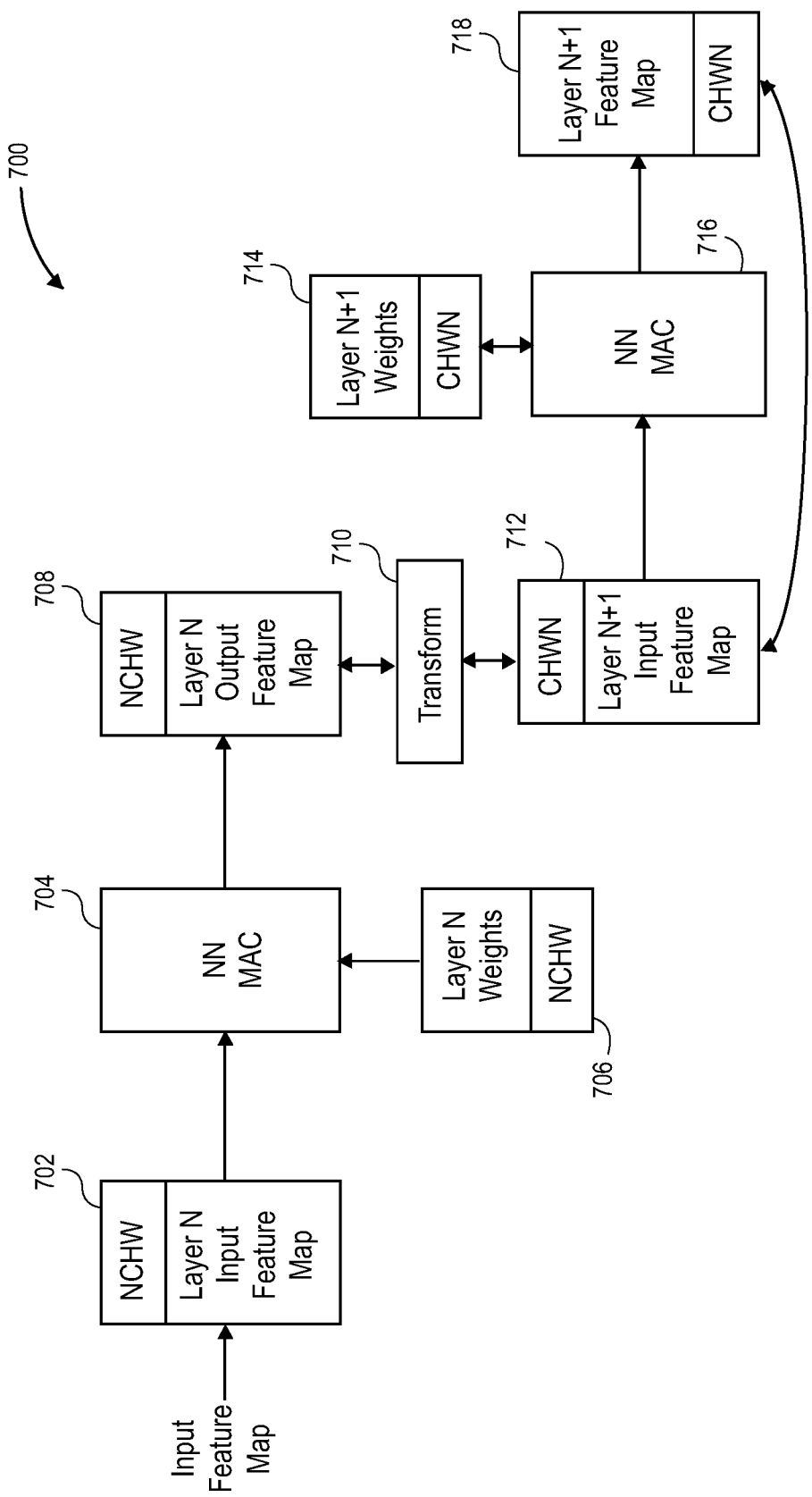
FIG. 7 illustrates one example of a flow diagram of an operation by the NN system of FIG. 6 to transform memory layouts during NN inference performance.

FIG. 7 illustrates one example of a flow diagram of an operation 700 by the NN system 600 of FIG. 6 to transform memory layouts during NN inference performance. In this example, operation 700 describes a CNN inference performance.

At block 702, initially input feature map data for convolution kernel computation is in a NCHW format stored in DDR memory 614 at a convolution layer N.

At block 704, a NN MAC performs a kernel computation such as a matrix dot product accumulation using layer N input blobs and weights at block 706, which can be stored in DDR memory 614 in the NCHW format.

At block 708, the output feature map from NN MAC block 704 is in the NCHW format.

At block 710, the output feature map in the NCHW format from block 708 is transformed into the CHWN format. For example, DSP or RISC processor 608 can signal or inform transform logic 607 based on meta file data to perform a transformation of the output feature map in the NCHW format from block 708 to the CHWN format. For other examples, at block 710, the output feature map at block 708 can be transformed into other formats such as NHWC format based on thresholds such as Ct, Nt, and Fmt stored in a meta file as described in FIG. 5.

At block 712, the output feature map that has been transformed into the CHWN format is an input feature map to the next convolution layer N+1.

At block 716, at layer N+1, the input feature map in the CHWN format is input to NN MAC and receives weights Layer N+1 weights are loaded to DDR memory 614 which is offline optimized at block 714 and performs a kernel computation such as a matrix dot product accumulation at convolution layer N+1 using layer N+1 input blob and weights.

At block 718, the output of NN MAC at block 716 is stored as a feature map in the CHWN format, and the next convolution layer is processed until all the convolution layers are processed.

In the foregoing specification, the invention has been described with reference to specific exemplary embodiments and examples thereof. It will, however, be evident that various modifications and changes may be made thereto without departing from the broader spirit and scope of disclosed embodiments and examples. The specification and drawings are, accordingly, to be regarded in an illustrative rather than a restrictive sense.

What is claimed is:

1. A neural network method comprising:
executing performance simulations of a neural network (NN) having a plurality of layers using a plurality of different memory layouts, the plurality of different memory layouts including a channel, height, width, and batches (CHWN) layout, a batches, height, width, and channel (NHWC) layout, and a batch, channel, height, and width (NCHW) layout, wherein NN data is initially stored in one of the plurality of different memory layouts;
deriving one or more thresholds based on the performance simulations, wherein the one or more thresholds include a feature map threshold (Fmt);
performing a kernel computation with the NN data including weights and activation computations for a current layer of the plurality of layers to produce multi-dimensional NN kernel computation data during an NN inference;

selecting a memory layout for a next layer of the NN among the plurality of different memory layouts based on the one or more thresholds, wherein the NHWC layout is selected if a giga floating point operations (GFlops) of the current layer divided by a memory size of the current layer is greater than the Fmt;

transforming the multi-dimensional NN kernel computation data from a current memory layout to the selected memory layout and storing, linearly in a physical memory, multi-dimensional NN kernel computation data using the selected memory layout during the NN inference; and providing the multi-dimensional NN kernel computation data stored in the selected memory layout as input to the next layer of the NN during the NN inference and performing a kernel computation for the next layer using the multi-dimensional NN kernel computation data in the selected memory layout.

2. The neural network method of claim 1, wherein the one or more thresholds include the Fmt, a channel number threshold (Ct), and a batch number threshold (Nt) and the CHWN layout is selected if a number of channels (C) based on input data is less than the Ct or if a number of batches (N) based on the input data is equal to or greater than the Nt.

3. The neural network method of claim 2, further comprising:
storing the Ct, Nt, and Fmt thresholds in a meta file.

4. The neural network method of claim 2, wherein the selecting the memory layout includes selecting the NCHW layout if the CHWN and NHWC layouts are not selected.

5. The neural network method of claim 1, wherein transforming the multi-dimensional NN kernel computation data from a current memory layout to the selected memory layout is performed in response to determining the multi-dimensional NN kernel computation data is not in the selected memory layout.

6. The neural network method of claim 5, wherein transforming the multi-dimensional NN kernel computation data is performed in hardware.

7. The neural network method of claim 6, wherein the hardware comprises a field programmable array (FPGA) or a programmable logic array (PLA).

8. A neural network system comprising:
a neural network simulator to execute a performance simulation of a neural network (NN) having a plurality of layers using a plurality of different memory layouts and derive one or more thresholds based on the performance simulation, wherein the plurality of different memory layouts include a channel, height, width, and batches (CHWN) layout, a batches, height, width, and channel (NHWC) layout, and a batch, channel, height, and width (NCHW) layout, and wherein the one or more thresholds include a feature map threshold (Fmt) and NN data is initially stored in one of the plurality of different memory layouts;
one or more memories storing input feature maps;
a plurality of multiply accumulate units (MACs) to:
receive the input feature maps to perform kernel computations for the NN, and
perform a kernel computation with the NN data including weights and activation computations for a current layer of the plurality of layers to produce output kernel computations;

transform logic to:
transform the output kernel computations from a current memory layout to a selected memory layout,
store, linearly in a physical memory, the output kernel computations in the selected memory layout for a next layer of the NN among a plurality of different memory layouts based on the one or more thresholds, wherein the NHWC layout is selected if a giga floating point operations (GFlops) of the current layer divided by a memory size of the current layer is greater than the Fmt, and
provide the output kernel computations stored in the selected memory layout as input to the next layer of the NN during NN inference; and
the plurality of MACs to perform a kernel computation for the next layer using the output kernel computations in the selected memory layout.

9. The neural network system of claim 8, wherein the one or more thresholds include the Fmt, a channel number threshold (Ct), and a batch number threshold (Nt) and the selected the memory layout is the CHWN layout if a number of channels (C) based on the input feature maps is less than the Ct or if a number of batches (N) based on the input features maps is equal to or greater than the Nt.

10. The neural network system of claim 9, wherein the one or more memories store the Ct, Nt, and Fmt thresholds in a meta file.

11. The neural network system of claim 9, wherein the selected memory layout is the NCHW layout if the CHWN and NHWC layouts are not selected.

12. The neural network system of claim 8, wherein the transform logic includes a field programmable array (FPGA), programmable logic arrays (PLAs), or hard-wired circuitry.

13. The neural network system of claim 8, wherein the physical memory comprises a static random-access memory (SRAM).

14. A non-transitory computer-readable medium including instructions, which if executed by a processing unit, causes the processing unit to perform an operation comprising:
executing performance simulations of a neural network (NN) having a plurality of layers using a plurality of different memory layouts, the plurality of different memory layouts including a channel, height, width, and batches (CHWN) layout, a batches, height, width, and channel (NHWC) layout, and a batch, channel, height, and width (NCHW) layout, wherein NN data is initially stored in one of the plurality of different memory layouts;
deriving one or more thresholds based on the performance simulations, wherein the one or more thresholds include a feature map threshold (Fmt);
performing a kernel computation with the NN data including weights and activation computations for a current layer of the plurality of layers to produce multi-dimensional NN kernel computation data during an NN inference;
selecting a memory layout for a next layer of the NN among the plurality of different memory layouts based on the one or more thresholds, wherein the NHWC layout is selected if a giga floating point operations (GFlops) of the current layer divided by a memory size of the current layer is greater than the Fmt;
transforming the multi-dimensional NN kernel computation data from a current memory layout to the selected memory layout and storing, linearly in a physical memory, multi-dimensional NN kernel computation data using the selected memory layout during the NN inference; and providing the multi-dimensional NN kernel computation data stored in the selected memory layout as input to the next layer of the NN during the NN inference and performing a kernel computation for the next layer using the multi-dimensional NN kernel computation data in the selected memory layout.

15. The non-transitory computer-readable medium of claim 14, wherein the one or more thresholds include the Fmt, a channel number threshold (Ct), and a batch number threshold (Nt) and the processing unit further performs an operation comprising:

selecting the CHWN layout if a number of channels (C) based on input data is less than the Ct or if a number of batches (N) based on the input data is equal to or greater than the Nt.

16. The non-transitory computer-readable medium of claim 15, wherein the processing unit further performs an operation comprising:

storing the Ct, Nt, and Fmt thresholds in a meta file.

17. The non-transitory computer-readable medium of claim 15, wherein the processing unit further performs an operation comprising:

selecting the NCHW layout if the CHWN and NHWC layouts are not selected.

18. The non-transitory computer-readable medium of claim 14, wherein transforming the multi-dimensional NN kernel computation data from a current memory layout to the selected memory layout is performed in response to determining the multi-dimensional NN kernel computation data is not in the selected memory layout.

19. The non-transitory computer-readable medium of claim 14, wherein the processing unit performs an operation comprising:

performing simulations of kernel computations in different memory layouts based on varying multi-dimension parameters.

20. The non-transitory computer-readable medium of claim 14, wherein the physical memory comprises a double data rate (DDR) memory.

* * * * *